(12) United States Patent
Miller et al.

(10) Patent No.: US 6,723,769 B2
(45) Date of Patent: Apr. 20, 2004

(54) POLYMERIZATION PROCESS

(75) Inventors: Mark B. Miller, Houston, TX (US); Scott D. Cooper, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 41 days.

(21) Appl. No.: 10/112,561

(22) Filed: Mar. 28, 2002

(65) Prior Publication Data

US 2003/0191215 A1 Oct. 9, 2003

(51) Int. Cl.$^7$ ................................................. C08K 5/14
(52) U.S. Cl. ........................ 524/236; 524/106; 525/391; 428/331
(58) Field of Search ................................ 524/236, 106; 525/391; 428/331

(56) References Cited

U.S. PATENT DOCUMENTS

| | | | | |
|---|---|---|---|---|
| 4,314,040 A | * | 2/1982 | Castro et al. ................ | 524/249 |
| 4,448,916 A | * | 5/1984 | Martenson ................... | 524/106 |
| 4,654,252 A | * | 3/1987 | Doyen ......................... | 428/213 |
| 4,764,425 A | * | 8/1988 | Balloni et al. ............... | 428/331 |
| 5,994,436 A | * | 11/1999 | Pierson ......................... | 524/236 |

* cited by examiner

Primary Examiner—David W. Wu
Assistant Examiner—Henry S. Hu
(74) Attorney, Agent, or Firm—William D. Jackson

(57) ABSTRACT

A process for the production and treatment of a stereoregular propylene polymer such as isotactic polypropylene. The isotactic polypropylene can be produced by catalysis employing a metallocene catalyst or employing a Ziegler-Natta catalyst. A polymerization reactor is operated to provide for the reaction of propylene supplied to the reactor to produce a stereoregular propylene polymer fluff. A product stream containing unreacted propylene and the propylene polymer fluff is withdrawn from the polymerization reactor. The product stream is treated to separate at least a portion of the unreacted propylene from the product stream. The polymer fluff is heated to a temperature sufficient to melt the propylene polymer. Incorporated into the propylene polymer fluff in an amount within the range of 0.01–0.08 wt. % is a tertiary amine formula:

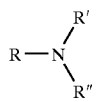

wherein R is an aliphatic group containing 8–18 carbon atoms and R' and R" are each independently a hydroxyalkyl group containing from 1 to 3 carbon atoms. Thereafter, the heated polymer fluff containing the tertiary amine is extruded to produce particles of the propylene polymer.

17 Claims, 2 Drawing Sheets

POLYMERIZATION PROCESS

FIELD OF THE INVENTION

This invention relates to a method for the production and treatment of stereoregular propylene polymers and more particularly to the treatment of isotactic propylene polymers involving the incorporation of ethoxylated amines as processing aids.

BACKGROUND OF THE INVENTION

Thermoplastic olefin polymers, such as linear polyethylene, polypropylene, and olefin copolymers, such as propylene/ethylene copolymer, are conveniently formed in continuous loop-type polymerization reactors and thermoformed to arrive at granules or pellets of the polymers. For example, polypropylene and/or propylene/ethylene copolymers are polymerized in continuous polymerization reactors in which the monomer stream is introduced into a reactor and circulated with an appropriate catalyst to produce the olefin homopolymer or copolymer. The polymer is withdrawn from the catalyst reactor and subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Polypropylene and propylene copolymers, as used in various applications involving production of films, fibers, and similar products in the polymers, are thermo-processed and shaped or oriented by one uni-directional or bi-directional stresses. Such polymers are thermoplastic crystalline polymers. Polymers of this nature are subject to degradation due to high temperatures and photochemical action induced by electromagnetic radiation in the visible light range and in the ultraviolet region. In order to retard the degradation of such polymeric objects, the base polymer system, which is molded or extruded to form the desired object, e.g. fiber or film, may be treated with hindered amine light stabilizers, identified by the acronym "HALS (hindered amine light stabilizers)" which function to protect the film, fiber, or other object against degradation due to electromagnetic radiation by radiation in the visible light spectrum.

Isotactic polypropylene is conventionally used in the production of films in which the polypropylene is heated and then extruded through one or more dies to produce a film or tape. The film thus produced can then be oriented in at least one direction. Typically, the polypropylene is heated and extruded and then subjected to biaxial orientation by stressing the film in both a longitudinal direction (referred to as the machine direction) and in a transverse or lateral direction sometimes referred to as the "tenter" direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

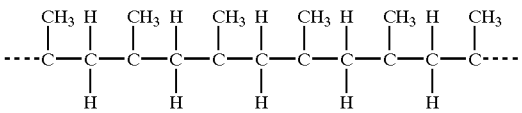

Stereoregular polymers, such as isotactic and syndiotactic polypropylene, can be characterized in terms of the Fisher projection formula. Using the Fisher projection formula, the stereochemical sequence of isotactic polypropylene, as shown by Formula (2), is described as follows:

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

The corresponding syndiotactic pentad is rrrr with each r representing a racemic diad. Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product. Catalysts that produce syndiotactic polypropylene are disclosed in U.S. Pat. No. 4,892,851. As disclosed there, the syndiospecific metallocene catalysts are characterized as bridged structures in which one Cp group is sterically different from the others. Specifically disclosed in the '851 patent as a syndiospecific metallocene is isopropylidene(cyclopentadienyl-1-fluorenyl) zirconium dichloride.

In most cases, the preferred polymer configuration will be a predominantly isotactic or syndiotactic polymer with very little atactic polymer. Catalysts that produce isotactic polyolefins can be characterized as falling in two general classes, metallocene catalysts and so-called "conventional" Ziegler-Natta catalysts. The conventional Ziegler-Natta catalysts are stereospecific complexes formed from a transition metal halide and a metal alkyl or hydride. Metallocene catalysts are coordination compounds or cyclopentadienyl groups coordinated with transitional metals through π bonding.

The polymerization catalysts may be characterized as supported catalysts or as unsupported catalysts, sometimes referred to as homogeneous catalysts. Metallocene catalysts are often employed as unsupported or homogeneous catalysts, although, as described below, they also may be employed in supported catalyst components. Traditional supported catalysts are the so-called "conventional" Ziegler-Natta catalysts, such as titanium tetrachloride supported on an active magnesium dichloride, as disclosed, for example, in U.S. Pat. Nos. 4,298,718 and 4,544,717, both to Myar et al. A supported catalyst component, as disclosed in the Myar '718 patent, includes titanium tetrachloride supported on an "active" anhydrous magnesium dihalide, such as magnesium dichloride or magnesium dibromide. The supported catalyst component in Myar '718 is employed in conjunction with a co-catalyst such and an alkylaluminum compound, for example, triethylaluminum (TEAL). The Myar '717 patent discloses a similar compound which may also incorporate an electron donor compound which may take the form of various amines, phosphenes, esters, aldehydes, and alcohols.

Stereospecific metallocenes are disclosed in U.S. Pat. Nos. 4,794,096 and 4,975,403, both to Ewen. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2HfQp \qquad (4)$$

In Formula (4), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Metallocene catalysts, such as those described above, can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion. Similar relationships can be established for isospecific metallocenes.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welbom '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, are also incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al. Various other catalyst systems involving supported metallocene catalysts are disclosed in U.S. Pat. No. 5,308,811 to Suga et al and U.S. Pat. No. 5,444,134 to Matsumoto.

The polymers normally employed in the preparation of oriented films are normally prepared through the use of conventional Ziegler-Natta catalysts of the type disclosed, for example, in the aforementioned patents to Myar et al. Thus, U.S. Pat. No. 5,573,723 to Peiffer et al discloses a process for producing biaxially-oriented polypropylene film based on an isotactic polypropylene homopolymer or propylene ethylene co-polymers. Other co-polymers of propylene and alpha-olefins having from 4–8 carbon atoms also may be employed in the Peiffer process.

It is also known to produce polypropylene-based films from syndiotactic polypropylene. Thus, syndiotactic polypropylene, such as that produced by syndiospecific metallocenes of the type disclosed in the aforementioned U.S. Pat. No. 4,892,851, can be used to produce oriented polypropylene films. Processes for the preparation of biaxially-oriented polypropylene films employing polymers produced by the use of isospecific metallocenes are disclosed in Canadian Patent Application No. 2,178,104. Isotactic polymers disclosed there are based upon the polymerization of propylene in the presence of heavily substituted silicon-bridged bis(indenyl) ligand structures involving di- or tri-substituted indenyl groups. The various polymers produced by these metallocenes catalysts are characterized in terms of molecular weight, molecular weight distribution, melting point, meltflow index, mean isotactic block length, and isotactic index as defined in terms of mm triads. The polymers produced had isotactic indices, as thus defined, of about 97–98% as contrasted with an isotactic index of 93% for a commercial polypropylene compared with a conventional Ziegler-Natta catalyst and molecular weight distributions ranging from about 2.0 to 3.0 as contrasted with a molecular weight distribution of 4.5 for the polypropylene produced by the conventional Ziegler-Natta catalyst.

In employing polypropylene and other polyolefin polymers, there are large numbers of additives which are sometimes used. As noted previously, hindered amine light stabilizers can be used. Other stabilizers which can be employed to stabilize the polymer product and the products into which the polymers are incorporated include various additives which function to stabilize the polymer products, not only against light or UV degeneration but also against thermal or oxidative degeneration or actinic degradation. Thus, as disclosed in U.S. Pat. No. 4,325,863 to Hinsken et al, various benzofuranone or indolinone compounds can be used as stabilizing agents for such polymers as polypropylene, polyethylene, propylene ethylene co-polymers, and various other polymeric materials. As disclosed in Hinsken et al, a wide range of benzofuranones, which may be substituted or unsubstituted to include both polycyclic and monocyclic lactones, can be employed. Preferably, these are incorporated in extruders in which the stabilizing compounds are mixed with granules of such polyethylene or polypropylene granules and then extruded into the desired product. U.S. Pat. No. 5,175,312 to Dubs et al discloses the use of various phenol benzofuran-2-ones as stabilizers in the polymeric materials which are formed into films, fibers, tapes, and the like. The 3-phenol benzofuranones of Dubs et al are generally characterized to include 3-phenol benzofuranones with substituent groups at the 7 position of relatively high molecular weight, e.g. alkyl, containing 14 or more carbon atoms, with substituent groups at either or both of the 4 and 5 positions of alkyl groups or various cyclo-alkyl substituents of somewhat lower molecular weights. The phenol substituent at the 3 position can be substituted with $C_1$–$C_4$ alkoxy, halide, or $C_1$–$C_8$ alkyl groups.

A somewhat different class of additives for use with polyolefins, such as polyethylene and polypropylene, are anti-static additives usually referred to simply as "anti-stats." Anti-stats which can be employed in conjunction with polymeric products, including films or molded objects, include medium to high molecular weight polyhydric alcohols, such as glycerol monolaurate or glycerol monostearate and ethoxylated tertiary amines of intermediate to high molecular weight. For example, U.S. Pat. No. 4,314,040 to Castro et al discloses an anti-stat which can be incorporated into a olefinic polymer such as polyethylene. In Castro et al, the anti-stat compositions are prepared by mixing a tertiary amine, such as N,N-bis-(2-hydroxyethyl) alkylamine with polypropylene with the product then suitable for use in polyethylene products. The alkyl groups are of intermediate to high molecular weight, ranging from about $C_6$ to $C_{18}$. Specifically disclosed in Castro et al is a tertiary amine such as N,N-bis-(2-hydroxyethyl) tallow amine and N,N-bis-(2-hydroxyethyl) coco amine incorporated in an amount within the range of 25–75 wt. % with a polymer such as polypropylene or polystyrene. The tertiary amine polyolefin blend is then added to a polyethylene as an anti-stat composition.

SUMMARY OF THE INVENTION

In accordance with the present invention, there is provided a process for the production and treatment of a stereoregular propylene polymer such as specifically isotactic polypropylene. The isotactic polypropylene can be produced by catalysis employing a metallocene catalyst or employing a Ziegler-Natta catalyst. In carrying out the invention a polymerization reactor is operated to provide for the reaction of propylene supplied to the reactor to produce a stereoregular propylene polymer fluff. A product stream containing unreacted propylene and the propylene polymer fluff is withdrawn from the polymerization reactor. The product stream is treated to separate at least a portion of the unreacted propylene from the product stream. The polymer fluff is heated to a temperature sufficient to melt the propylene polymer. A tertiary amine is incorporated into the propylene polymer fluff in an amount within the range of 0.01–0.08 wt. %. The tertiary amine is characterized by the formula:

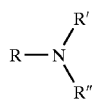
(5)

wherein R is an aliphatic group containing 8–18 carbon atoms and R' and R" are each independently a hydroxyalkyl group containing from 1 to 3 carbon atoms. Subsequent to the heating and incorporation of the tertiary amine, the heated polymer fluff containing the tertiary amine is extruded to produce particles of the propylene polymer. In a further aspect of the invention, the resulting propylene polymer particles are heated to a molten state and extruded to produce an initial film. The initial film is processed by drawing of the film at differential speeds to directionally orient the film in the machine direction at a line speed of 300 feet per minute or more. Thereafter, the film is stressed in the transverse direction to provide a biaxially-oriented film.

DETAILED DESCRIPTION OF THE INVENTION

The present invention involves the use of a particular class of tertiary amines which are incorporated in the formation of a propylene polymer product to provide a product which is especially suitable for use in the formation of film products, particularly oriented film products. The tertiary amine is added as a processing aid to the propylene polymer fluff in the course of the polymer recovery process. That is, the tertiary amine is incorporated into the polymer prior to the extrusion of the polymer to produce pellets as contrasted with adding it during the use of the polymer pellets to produce a film. The tertiary amine processing agent which is incorporated into the fluff in a small concentration, no more than 0.08 wt. % to facilitate processing when using the subsequently-formed polypropylene particles, can be characterized by the following formula:

(5)

In Formula (5), R is an aliphatic group containing 8–18 carbon atoms (including mixtures of $C_8$ to $C_{18}$ aliphatic groups) and R' and R" are each independently a hydroxyalkyl group containing from 1 to 3 carbon atoms. As described in greater detail below, the tertiary hydroxyalkyl amine can be incorporated with a minor amount of a polymer carrier, such as polypropylene, in the manner as disclosed in the aforementioned patent to Castro. In addition, the tertiary amine additive can be expected to provide anti-static properties to films which may be ultimately produced from the polymer pellets arrived at by the initial extruding step. However, the tertiary amine additive is employed not in the course of forming films or fabricating products as in the case of the aforementioned patent to Castro but instead is added to the fluff prior to pelletizing.

Figure 1:
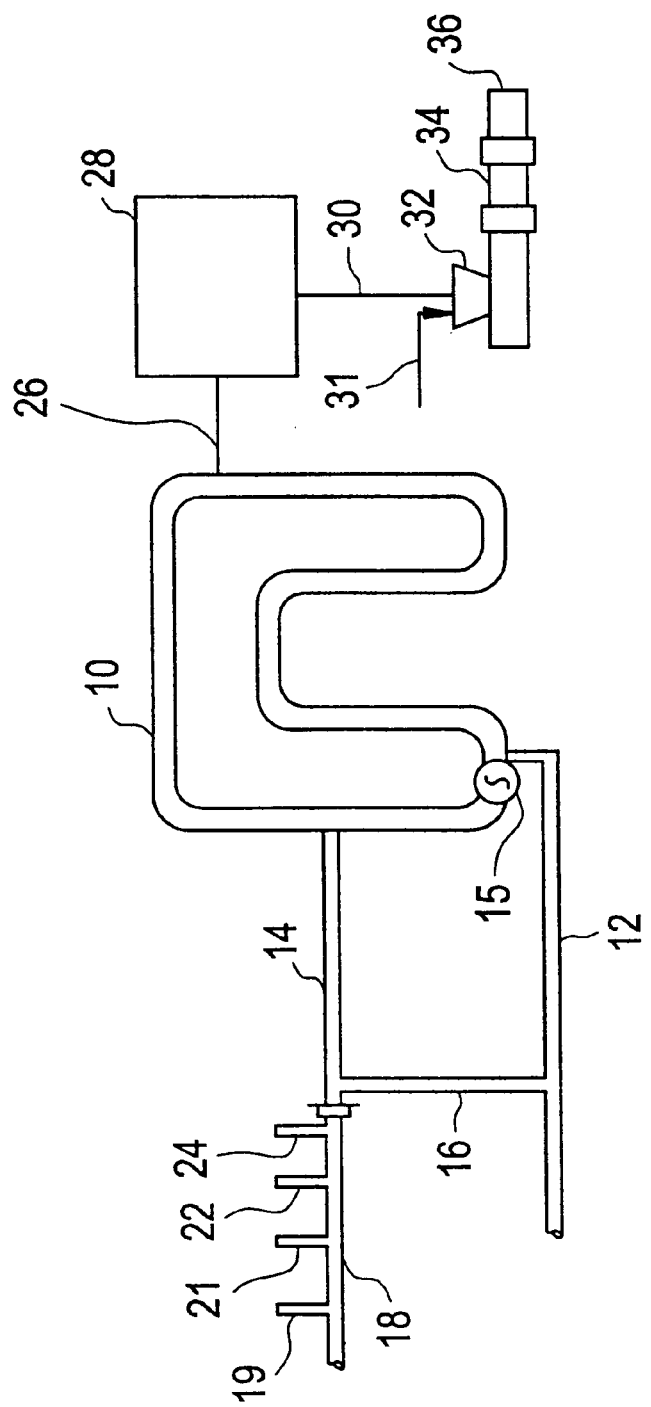
FIG. 1 is a schematic illustration of a process for the polymerization of polypropylene in which the present invention is implemented.

The invention will be described with reference to a loop-type reactor used in the production of stereoregular polypropylene, specifically isotactic polypropylene, although it will be recognized that the invention may be carried out with respect to syndiotactic polypropylene or other propylene polymers or copolymers which may incorporate other olefin polymers such as polyethylene. Referring to FIG. 1, there is illustrated a loop-type polymerization reactor 10 which is supplied with propylene monomer through an input line 12 and a catalyst system through an input line 14. The continuous loop-type reactor is, as will be understood by those skilled in the art, equipped with an impeller 15 which functions to circulate the polymerization reaction mass continuously through the loop-type reactor under controlled temperature and pressure conditions. The polymerization reactor may be operated under any suitable conditions. Liquefied propylene preferably is used as the carrier medium in the course of the polymerization reaction within reactor 10. Alternatively, an inert solvent such as hexane can be used.

A catalyst system, which may take the form of a conventional Ziegler-Natta catalyst system or a metallocene-based catalyst system of the types described previously, is incorporated into the polymerization reactor through catalyst feedline 14 in which the catalyst components are prepolymerized with a small amount of propylene monomer which is supplied to line 14 through line 16 as disclosed in U.S. Pat. No. 4,767,735 to Ewen et al before being introduced into the catalyst system. For example, the catalyst may take the form of supported titanium tetrachloride supported on an activated magnesium dichloride or dibromide employed in conjunction with a co-catalyst, such as triethylaluminum, and an electron donor, such as diphenyldimethoxysilane (DPMS), as disclosed in the aforementioned patent to Ewen et al, or methylcyclohexyl-dimethoxysilane, as disclosed in U.S. Pat. No. 4,927,797 to Ewen. In the prepolymerization injection system, a carrier solvent, such as hexane or heptane, is supplied to a mixing line 18 via a supply line 19. The co-catalyst is supplied through line 21 and the electron donor through line 22 and then mixed with the supported titanium tetrachloride catalyst (or another Ziegler-Natta catalyst) introduced through line 24 and then prepolymerized and introduced into the reactor 10 via line 14. The catalyst may be supplied either continuously or intermittently to the carrier stream for inclusion into the reactor. Preferably, the catalyst is prepolymerized in a tubular reactor operated under a relatively short residence time as disclosed in Ewen et al. For a further description of suitable prepolymerization times and procedures, reference is made to the aforementioned U.S. Pat. No. 4,767,735 to Ewen et al, the entire disclosure of which is incorporated herein by reference.

A suitable Ziegler-Natta catalyst can take the form of a heterogeneous titanium tetrachloride supported on an activated support. Metallocene catalyst systems which may be either homogeneous or heterogeneous can also be employed in carrying out the present invention. In the production of isotactic polypropylene, bridged metallocene catalyst systems of the type disclosed in the aforementioned U.S. Pat. Nos. 4,794,096 and 4,975,403 may be employed. Similarly, the catalyst system used in producing the isotactic polypropylene could take the form of supported metallocene catalyst as disclosed in the aforementioned U.S. Pat. Nos. 4,701,432 and 4,808,561. Hybrid catalyst systems employing both metallocene-based catalysts and supported titanium tetrachloride-based catalysts, such as disclosed in the aforementioned U.S. Pat. No. 5,242,876, may also be employed. In addition, where it is desired to form a syndiotactic polypropylene, catalyst systems such as disclosed in the aforementioned U.S. Pat. Nos. 4,892,851 and 5,243,002 may be introduced into the loop-type reactor.

At the product side of the reactor, the propylene polymer is withdrawn via line 26. Typically, a deactivator is incorporated into the product stream in order to terminate the polymerization reaction in the solvent stream containing the polypropylene. The product is supplied to a concentration and recovery system 28 in which polypropylene fluff is extracted through line 30. Propylene is recovered through a suitable purification and recovery system (not shown). The product stream containing the polypropylene fluff, which is now free of gaseous propylene, is withdrawn from the recovery system via line 30.

The polypropylene fluff is supplied to the input hopper 32 of an extruder-die system 34. In the extruder-die system, the polymer is heated to a molten state, and the molten polymer is extruded and then cut into appropriate particles. Typically, a polypropylene product may be extruded and die cut into pellets which are discharged from the product end 36 of the extruder-die system 34. These products may then be heated and extruded in various applications, such as in the production of films as described in greater detail below.

The propylene polymer particles thus produced can be used in film-forming procedures either immediately or after storage for periods ranging from days to months. In general, the film-forming procedure involves heating the polymer particles to a molten state and extruding the molten polymer to provide a film which can be in the form of a cast film or an oriented film, usually a biaxially-oriented film. An extruded film is subject to drawing at differential drawing speeds to provide a draw ratio sufficient to form a continuous polypropylene film which can then be stressed in a transverse direction to produce a biaxially-oriented film.

In general, biaxially-oriented films can be produced by any suitable technique, such as disclosed in the aforementioned Canadian Patent Application No. 2,178,104 to Peiffer et al. As described in the Peiffer et al application, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometimes with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as corona treatment or flame treatment, as described, for example, in the aforementioned Canadian Patent Application No. 2178104 or in U.S. Pat. No. 4,029,876 to Beatty, the entire disclosures of which are incorporated herein by reference.

Figure 2:
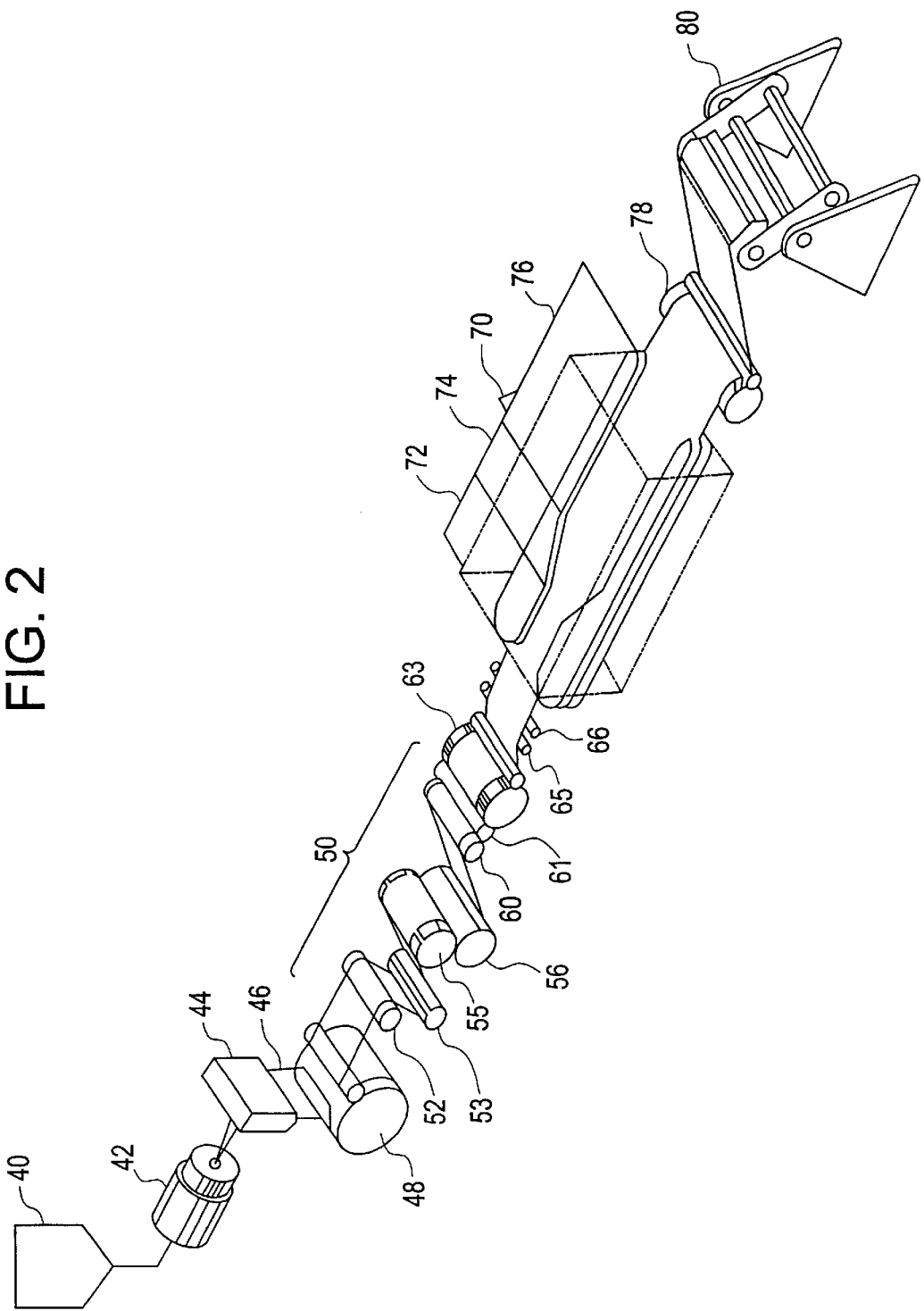
FIG. 2 is a schematic illustration of a film orienting process which can be used to implement the present invention.

Turning now to FIG. 2, there is shown a schematic illustration of a suitable "Tenter Frame" orientation process which may be employed in producing biaxially-oriented polypropylene film. More particularly and with reference to FIG. 2, a source of polymer particles is supplied from a hopper 40 to an extruder 42 where it is heated and extruded and from there to a slot die 44 which produces a flat, relatively thick film 46 at its output. Film 46 is applied over a chill roller 48, and it is cooled to a suitable temperature within the range of about 30–60° C. The film is drawn off the chill roller 48 to a stretching section 50 to which the machine direction orientation occurs by means of idler rollers 52 and 53 which lead to preheat rollers 55 and 56.

As the film is drawn off the chill roller 48 and passed over the idler rollers, it is cooled to a temperature of about 30–60°

C. In stretching the film in the machine direction, it is heated by preheat rollers 55 and 56 to an incremental temperature increase of about 60°–100° C. and then passed to the slow roller 60 of the longitudinal orienting mechanism. The slow roller may be operated at any suitable speed, usually about 100–300 feet per minute. The fast roller 61 is operated at a suitable speed, typically about 500–1500 feet per minute and more usually about 1000–1500 feet per minute, to provide a surface speed at the circumference of about 4–7 times that of the slow roller in order to orient the film in the machine direction. As the oriented film is withdrawn from the fast roller, it is passed over roller 63 at room temperature conditions. From here it is passed over tandem idler rollers 65 and 66 to a lateral stretching section 70 where the film is oriented by stretching in the transverse direction. The section 70 includes a preheat section 72 comprising a plurality of tandem heating rollers (not shown) or oven heaters where it is again reheated to a temperature within the range of 130–180° C. Typically, lateral section 70 comprises a tenter frame disposed with a large oven which uses radiant heat. From the preheat section 72 of the tenter frame, the film is passed to a stretching or draw section 74 where it is progressively stretched by means of tenter clips (not shown) which grasp the opposed sides of the film and progressively stretch it laterally until it reaches it maximum lateral dimension. Lateral stretching ratios are typically greater than machine direction stretch ratios and often may range from 5–12 times the original width. Lateral stretching ratios of 8–10 times are usually preferred. The concluding portion of the lateral stretching phase includes an annealing section 76, such as an oven housing, where the film is heated at a temperature within the range of 130°–170° C. for a suitable period of time, about 1–10 seconds. The annealing time helps control certain properties, and increased annealing can be used specifically to reduce shrinkage. The biaxially-oriented film is then withdrawn from the tenter frame and passed over a chill roller 78 where it is reduced to a temperature of less than about 50° C. and then applied to take-up spools on a take-up mechanism 80. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

From the foregoing description, it will be recognized that much of the processing of polypropylene or other thermoplastic polymers can be carried out at elevated temperatures, ranging as high as 320° C. These high processing temperatures can induce deterioration of the polymer product. In the case of polypropylene, at these high temperatures, the polymer can undergo thermal degradation resulting in undesirable properties, such as a decrease in molecular weight and melt viscosity and an increase in the melt flow index.

In order to retard such thermal degradation of the polymer product, one solution involves the introduction of a thermal stabilizer into the polypropylene product stream. Conventionally-used stabilizers can take the form of phenolic anti-oxidants and various processing stabilizers such as phosphites and phosphonites. Hindered amine light stabilizers (HALS) can also be introduced in the process in lieu of or in addition to other stabilizers. Such hindered amine light stabilizers may be of any suitable type such as described in U.S. Pat. No. 4,929,653 to Kletecka et al. and U.S. Pat. No. 5,354,795 to Ueno et al. The HALS components may be described as bridged heterocyclic amines having at least one, and in most cases a plurality, of heterocyclic amino groups.

A number of problems can be encountered in the processing of polypropylene to produce an oriented film product. High line speeds are often desirable in order to achieve efficient operation of the orienting equipment. However, as the line speed is increased, it is often at the expense of several factors which detract from the processing operation itself as well as from the final film product. One factor is the film gauge. It is often desirable to maintain the gauge at a relatively constant thickness, usually within the range of 10–40 microns. However, as line speed is increased, gauge variations generally show an attendant increase. Another problem associated with increasing line speed is "necking." Necking can be characterized as a narrowing of the film width in the transverse direction. Necking is not only undesirable in terms of the quality of the final product but also can result in severe operational problems. For example, necking can become so severe that the tenter clips which are used to transversely orient the film become ineffective. Another problem which becomes more severe with increasing line speed is the variations in the pressure at which the polypropylene is extruded in extruder 42.

In order to reduce the dilatorious effects of the line speed related phenomena discussed above, the present invention involves the use of an N,N-hydroxyethyl tertiary amine in low concentrations in which it is effective as a processing aid to inhibit necking and gauge variations while not causing problems in processing during the tenter operation and without imparting any noticeable extruder pressure variation. The tertiary ethyoxylated amine employed in the present invention is used in concentrations below the level at which it is normally used as an anti-stat and is incorporated into the propylene polymer as a processing aid prior to extruding the polymer to produce the polymer pellets which are ultimately fed to the hopper 40 (FIG. 2) in the orienting process. That is, rather than incorporating the tertiary amine with a resin carrier and then adding it to the polymer during its processing, e.g. polyethylene in the case of the aforementioned Castro et al patent, the hydroxyethyl tertiary amine of the present invention is incorporated into the fluff prior to extrusion to form the propylene pellets. Specifically with reference to FIG. 1, the tertiary amine is added through line 31 to hopper 32 and is incorporated in low concentrations, specifically in an amount within the range of 0.01–0.08 wt. %. This concentration is less than the concentration in which the hydroxyethyl tertiary amine is typically employed as an anti-stat and, as noted above, is added to the fluff rather than to the final product. Nevertheless, the polypropylene incorporating the hydroxyethyl tertiary amine in accordance with the present invention retains a function as an anti-stat as well as functioning as a processing aid.

In experimental work respecting the invention as described hereinafter, the presence of the alkoxylated fatty tertiary amine in concentrations of 0.1 wt. % resulted in smoking and a distinct odor when extruded through a 10-inch die. An upper concentration limit of 0.08 wt. % can be expected to reduce these undesirable side effects somewhat, and if desired in carrying out the invention, even lower amounts of the tertiary amine can be incorporated into the polymer fluff. Thus, enough upper limit of 0.06 wt. % can be imposed, and in a further aspect of the invention, the tertiary amine can be incorporated into the polymer fluff in an amount with the range of 0.02–0.05 wt. %.

As noted previously, the tertiary amine processing aid employed in the present invention can be characterized by the following formula:

 (5)

wherein R is an aliphatic group containing 8–18 carbon atoms and R' and R" are each independently a hydroxyalkyl group containing from 1 to 3 carbon atoms. Preferably, R' and R" are each a hydroxyethyl group.

The tertiary amine processing aid employed in the present invention can be identical to the materials disclosed in the aforementioned patent to Castro et al as anti-stats and can be characterized by the following formula:

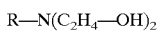

wherein R is a $C_8$–$C_{18}$ aliphatic group or mixtures of $C_8$–$C_{18}$ aliphatic groups. Normally, to ensure incorporation of the tertiary amine into the propylene fluff as a processing aid, R will have an average of carbon chain length within the range of 12–18 carbon atoms.

In experimental work respecting the present invention, two resins denominated herein as Resin A and Resin B were extruded through a 10-inch die to form cast sheets having a thickness of 16 mils. The cast sheets were then biaxially oriented at a draw ratio of 3.5. Resin A and Resin B, which contained 0.1 wt. % of $N_9$N-bis(2-hydroxyethyl) coco amine, had characteristics as set forth in Table I below.

TABLE I

| Property/Polymer | A | B |
|---|---|---|
| HB#LL# | 63416 | 31757 |
| MFR, g/10 min (QC) | 2.8 | 2.9 |
| Xylene solubles, % (QC) | 3.9 | 3.6 |
| Decalin-solubles, % (QC) | 6.6 | 5.7 |
| Die Swell (QC) | 2.7 | 2.6 |

As indicated previously, Resin B contained about 0.1 wt. % of the $N_9$N-bis(2-hydroxyethyl) coco amine. The amine was carried on a polypropylene base with the ratio of amine to polypropylene of 3:1. The film produced from Polymer A showed severe necking at 400 feet per minute which prevented effective orientation in the transverse direction. The maximum line speed for satisfactory operation employing Polymer A was about 300 feet per minute. Polymer B, which contained the hydroxyethylated tertiary amine showed substantially no necking problems at 400 feet per minute (the limit of the processing equipment). Similar results caii be anticipated at line speeds of 600 feet per minute or more.

The Polymer B incorporating the tertiary amine additive showed slightly better gauge characteristics than Polymer A at a line speed of 300 feet per minute. Film gauge variation increases as the line speed and the processing equipment increases. Thus, the improvement in film gauge variation can be expected to be significant at the higher line speeds made possible by the use of the tertiary amine additive in accordance with the present invention. Line speeds as high as 1,000 feet per minute, or even more, are contemplated in which improvement in the gauge variation will be very significant.

The extruder pressure was observed for both polymers, and it appeared that the use of the hydroxyalkyl tertiary amine in accordance with the present invention produced no significant variation in extruder pressure. Thus, both reduced necking and less gauge variation can be achieved when employing the present invention without any significant extruder pressure variation.

Having described specific embodiments of the present invention, it will be understood that modifications thereof may be suggested to those skilled in the art, and it is intended to cover all such modifications as fall within the scope of the appended claims.

What is claimed:

1. In the production and treatment of a stereoregular propylene polymer, the method comprising:

a. operating a polymerization reactor for the reaction of propylene supplied to said reactor to produce a stereoregular propylene polymer fluff;

b. withdrawing a product stream containing unreacted propylene and said propylene polymer fluff from said polymerization reactor;

c. separating at least a portion of said unreacted propylene from said product stream;

d. heating said propylene polymer fluff to a temperature sufficient to melt said propylene polymer fluff;

e. incorporating into said propylene polymer fluff in an amount within the range of 0.01–0.08 wt. % a tertiary amine characterized by the formula:

wherein R is an aliphatic group containing from 8–18 carbon atoms and R' and R" are each independently a hydroxyalkyl group containing from 1 to 3 carbon atoms; and f. subsequent to said heating and incorporation of said tertiary amine, extruding said heated polymer fluff containing said tertiary amine to produce particles of said amine treated propylene polymer.

2. The method of claim 1 wherein said tertiary amine is incorporated into said polymer fluff in an amount within the range of 0.01–0.06 wt. %.

3. The method of claim 1 wherein said tertiary amine is incorporated into said propylene polymer fluff in an amount within the range of 0.02–0.05 wt. %.

4. The method of claim 1 wherein R' and R" are the same.

5. The method of claim 4 wherein the substituent groups R' and R" are each a hydroxyethyl group.

6. The method of claim 1 wherein said tertiary amine is N,N-bis(2-hydroxyethyl coco amine.

7. The method of claim 6 wherein said N,N-bis(2-hydroxyethyl) coco amine is in admixture with polypropylene in a weight ratio of amine to polypropylene of about 3 at the time of incorporation into said polypropylene fluff.

8. The method of claim 7 wherein said polymer fluff comprises isotactic polypropylene.

9. The method of claim 1 further comprising heating the propylene polymer particles to a molten state and extruding said molten polymer to produce an initial film and processing said film by drawing said film at differential drawing speeds to directionally orient said film in the machine direction at a line speed of at least 300 feet per minute and thereafter stressing said film in the transverse direction to provide a biaxially-oriented film.

10. The method of claim 9 wherein said polymer fluff comprises isotactic polypropylene.

11. The method of claim 10 wherein said film is oriented in the machine direction at a line speed of at least 400 feet per minute.

12. The method of claim 10 wherein said film is oriented in the machine direction at a line speed of at least 600 feet per minute.

13. The method of claim 10 wherein the substituent groups R' and R" are each a hydroxyethyl group.

14. The method of claim 13 wherein said tertiary amine is N,N-bis(2-hydroxyethyl coco amine.

15. The method of claim 14 wherein said tertiary amine is incorporated into said polymer fluff in an amount within the range of 0.01–0.06 wt. %.

16. The method of claim 15 wherein said tertiary amine is incorporated into said propylene polymer fluff in an amount within the range of 0.02–0.05 wt. %.

17. The method of claim 14 wherein said N,N-bis(2-hydroxyethyl) coco amine is in admixture with polypropylene in a weight ratio of amine to polypropylene of about 3 prior to the time of incorporation into said polypropylene fluff.

* * * * *